United States Patent
Beidle

(10) Patent No.: US 12,446,566 B2
(45) Date of Patent: Oct. 21, 2025

(54) METHOD AND APPARATUS FOR ATTRACTING AND CAPTURING BIRDS

(71) Applicant: Ecolab USA Inc., Saint Paul, MN (US)

(72) Inventor: Brian Alan Beidle, Fishers, IN (US)

(73) Assignee: Ecolab USA Inc., Saint Paul, MN (US)

( * ) Notice: Subject to any disclaimer, the term of this patent is extended or adjusted under 35 U.S.C. 154(b) by 85 days.

(21) Appl. No.: 18/322,871

(22) Filed: May 24, 2023

(65) Prior Publication Data

US 2023/0380405 A1    Nov. 30, 2023

Related U.S. Application Data

(60) Provisional application No. 63/365,355, filed on May 26, 2022.

(51) Int. Cl.
*A01M 23/08* (2006.01)
*A01K 7/02* (2006.01)

(52) U.S. Cl.
CPC .............. *A01M 23/08* (2013.01); *A01K 7/02* (2013.01)

(58) Field of Classification Search
CPC ................................ A01M 23/08; A01K 7/02
USPC .............................................................. 43/65
See application file for complete search history.

(56) References Cited

U.S. PATENT DOCUMENTS

| | | | |
|---|---|---|---|
| 214,934 A * | 4/1879 | Mann | A01M 21/00 43/65 |
| 777,579 A * | 12/1904 | Wilt | A01M 23/04 43/69 |
| 1,262,160 A * | 4/1918 | Barker | A01M 23/08 43/66 |
| 1,361,417 A | 12/1920 | Teasdale | |
| 1,420,880 A | 6/1922 | John | |
| 1,506,045 A * | 8/1924 | Boyer | A01M 23/08 43/65 |
| 1,509,874 A | 9/1924 | John | |
| 1,677,723 A | 7/1928 | Maxwell | |
| 2,897,627 A | 8/1959 | Neid | |
| 2,995,861 A | 8/1961 | Osborn | |
| 3,393,468 A * | 7/1968 | Wood | A01M 23/08 43/66 |
| 4,030,229 A | 6/1977 | Sale | |

(Continued)

FOREIGN PATENT DOCUMENTS

| CN | 109169572 | 1/2019 |
|---|---|---|
| CN | 109169572 A | 1/2019 |

(Continued)

OTHER PUBLICATIONS

"Havahart Trap—Model 0—for Mice, Rats, Shrews", [online]. (c) 1997-2019 Peaceful Valley Farm Supply, Inc. (Item No. PAT060). Retrieved from the Internet: URL: https: www.groworganic.com havahart-trap-model-0-10-x3-x3.html, (Feb. 17, 2017), 3 pages.

(Continued)

*Primary Examiner* — Christopher D Hutchens
(74) *Attorney, Agent, or Firm* — Schwegman Lundberg & Woessner, P.A.

(57) ABSTRACT

An example of a system for removing target animals such as birds from an area in a humane manner includes a cage with a substantially unidirectional entry and a device for attracting the target animals into the cage through the entry. The target animals captured in the cage can be released to another area as needed.

20 Claims, 5 Drawing Sheets

(56) References Cited

U.S. PATENT DOCUMENTS

| | | | |
|---|---|---|---|
| 4,563,835 A | 1/1986 | Job | |
| 4,829,704 A | 5/1989 | Richardson | |
| 5,325,622 A | 7/1994 | Merickel | |
| 5,406,741 A | 4/1995 | Little et al. | |
| 8,733,291 B2 | 5/2014 | Dunigan | |
| 10,973,221 B1 * | 4/2021 | Caffrey | A01M 23/08 |
| 2008/0256842 A1 * | 10/2008 | Vasseghi | A01M 23/08 |
| | | | 43/65 |
| 2009/0205245 A1 * | 8/2009 | Orchard | A01M 31/002 |
| | | | 43/65 |
| 2014/0352199 A1 * | 12/2014 | Matney | A01M 23/04 |
| | | | 43/61 |

FOREIGN PATENT DOCUMENTS

| | | |
|---|---|---|
| DE | 29810970 | 9/1998 |
| DE | 29810970 U1 | 9/1998 |
| JP | 2004097001 A * | 4/2004 |

OTHER PUBLICATIONS

"Havahart Trap—Model 0—for Mice, Rats, Shrews", [online]. © 1997-2019 Peaceful Valley Farm Supply, Inc. (Item No. PAT060). Retrieved from the Internet: <URL: https://www.groworganic.com/havahart-trap-model-0-10-x3-x3.html>, (Feb. 17, 2017), 3 pages.

* cited by examiner

METHOD AND APPARATUS FOR ATTRACTING AND CAPTURING BIRDS

CROSS-REFERENCE TO RELATED APPLICATION

This patent application claims the benefit of U.S. Provisional Patent Application No. 63/365,355, filed May 26, 2022, which is incorporated by reference herein in its entirety.

TECHNICAL FIELD

The present disclosure relates generally to animal removal and more particular to a method and apparatus for attracting and capturing multiple birds for removing birds in a humane manner.

BACKGROUND

Animals such as birds and rodents can create serious problems for commercial and residential property inhabitants and owners. For example, birds can roost or nest in or around man-made structures, such as in food retail and warehouse facilities. They can deface structures causing property and structural damage, create an unsanitary environment with droppings and nesting material, cause food contamination and loss of product, transmit diseases to humans and animals, carry ectoparasites which may bite humans and/or contaminate food, cause economic loss due to the need to clean up after them and to repair damage, and be a nuisance to employees and customers. Bird issues can result in damage to business reputation and loss of business when merchandise and food items become littered with nesting debris and bird droppings, and can cause operations to shut down for pest bird removal, negatively impacting sales. Birds may remain and reproduce in the facility indefinitely if not properly controlled.

Environmental concerns and local laws can sometimes require that birds be released unharmed, which is complicated by the fact that many times the birds must be captured at inconvenient or inaccessible locations to be removed. Thus, there is a need for excluding birds and/or other animals from various areas of commercial and residential establishments in a humane manner.

SUMMARY

A system for removing target animals such as birds from an area in a humane manner includes a cage with a substantially unidirectional entry and a device for attracting the target animals into the cage through the entry. The target animals captured in the cage can be released to another area as needed.

An example of an apparatus for attracting and capturing target animals is provided. The apparatus includes a cage and an attracting device. The cage can include a floor, a roof, walls coupled between the floor and the roof, and an entry on the roof, the entry defining a hole and a substantially unidirectional barrier adjacent the hole. The barrier can include features arranged to allow the target animals to enter the cage through the hole and to prevent the entered target animals from exiting the cage through the hole. The attracting device can be configured to be placed in the cage to attract the target animals into the cage. In various examples, the substantially unidirectional barrier can include spikes and/or one or more deflectors.

An example of a method for attracting and capturing target animals is also provided. The method can include providing a cage including a floor, a roof, walls coupled between the floor and the roof, and an entry on the roof. The entry can be configured to allow the target animals to enter the cage through a hole and to prevent the entered target animals from exiting the cage using a substantially unidirectional barrier including spikes arranged to prevent the entered target animals from exiting the cage through the hole. The method can further include placing the cage in an area from which the target animals are intended to be excluded and producing an attracting effect to lure the target animals into entering the cage using an attracting device. In various examples, the substantially unidirectional barrier is formed by arranging spikes and/or one or more deflectors to allow the target animals to enter the cage through the hole while preventing the entered target animals from exiting the cage through the hole.

This summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

The drawings illustrate generally, by way of example, various embodiments discussed in the present document. The drawings are for illustrative purposes only and may not be to scale.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The scope of the present invention is defined by the appended claims, along with the full scope of legal equivalents to which such claims are entitled.

The present subject matter relates to, among other things, methods and devices for attracting and capturing multiple animals for humane removal. In various embodiments, an animal trap includes a cage sized to capture multiple animals and retain the captured animals until they are released, such as periodically and/or when the cage is full. While a bird trap is specifically discussed as an example, the present subject can be applied for removing other types of animals.

In various embodiments, a bird trap includes a cage with a sloped roof, A substantially unidirectional entry is constructed on the roof to allow birds to enter the cage while being prevented or discouraged from exiting the cage. The entry can include a hole (such as a slot-shaped hole) to allow birds to enter and spikes and/or deflectors on the underside to prevent or discourage the entered birds from escaping. One or more non-toxic attractant devices and/or substances are placed in the cage to lure the birds into the cage through the entry. One example of an attractant device includes a running water source (e.g., with a reservoir and electric pump) to which birds tend to be attracted. Such bird traps can be deployed in areas where bird exclusion in a humane manner is required or desired, such as inside stores, food plants, warehouses, and grocery establishments. In various embodiments, specific types of birds may be targeted, and the entry can be sized and/or otherwise configured accordingly. For example, the hole can be sized to target on sparrows, starlings, and/or pigeons. Bird traps with entries of different size can be deployed, for example when bird of very different sizes are targeted. Such bird traps can also be useful against rodents such as mice and rats, which can also squeeze through the entry to gain access to the water and/or other baits.

Figure 1:
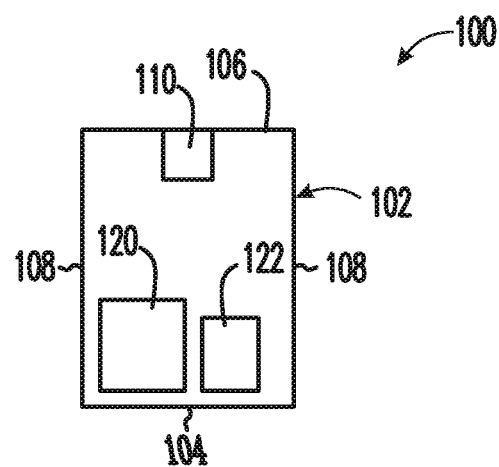
FIG. 1 shows a side view illustrating an embodiment of a system for attracting and capturing target animals.

FIG. 1 shows a side view illustrating an embodiment of a system 100 for attracting and capturing target animals. In various embodiments, system 100 is configured to attract and capture multiple target animals for release periodically and/or as needed, thereby removing the target animals in a humane manner from an area where the system is deployed. In various embodiments, system 100 is used for removing birds from an area where their presence and activities causes problems, which the target animals including specific species of birds observed in the area. System 100 may also be used for removing other pest animals, such as rodents, from the area.

System 100 can include a cage 102 and an attracting device 122. Cage 102 can include a floor 104, a roof 106, walls 108, an entry 110, and an exit 120. Walls 108 are coupled between floor 104 and roof 106 to form an enclosure to house the captured target animals. Entry 110 is incorporated onto the roof and configured to allow the target animals to enter the enclosure and to prevent the entered target animals from exiting the enclosure. Attracting device 122 can be placed in cage 102 to attract the target animals into cage 102.

In various embodiments, cage 102 has a size suitable for housing multiple animals of the target animals such as birds and/or rodents. Entry 110 is configured to allow entry of the target animals one or more at a time. Floor 104 can include a solid floor, a mesh floor, or a floor having solid and mesh portions. Roof 106 can include a solid roof, a mesh roof, or a roof having solid and mesh portions. The solid roof or solid portion of the roof can be transparent or semi-transparent. Walls 108 can include solid walls, mesh walls, or a combination of solid and mesh walls. The solid wall can be transparent or semitransparent. Examples of materials for constructing each of floor 104, roof 106, and walls 108 include metal, fiberglass, polyester, plexiglass, or any combination of such materials.

In various embodiments, roof 106 can be a horizontal roof or a sloped roof that includes at least one slope having a slope upper end and a slope lower end. Entry 110 can be positioned anywhere on the roof (e.g., in the center on along an edge of the root). In one embodiment in which roof 106 is a sloped roof, entry 110 is positioned at the slope lower end.

Exit 120 allows for release of the captured target animals. System 100 allows for multiple cycles of capturing and releasing the target animals in a humane manner. In various embodiments, exit 120 can be constructed on floor 104, roof 106, or walls 108. Exit 120 can also be formed by allowing one of floor 104, roof 106, or walls 108 to be opened or detached from cage 102.

In various embodiments, entry 110 includes features that forms a substantially unidirectional barrier that allows entries of multiple target animals, one or more at a time. Examples of such features are discussed below with reference to FIGS. 2 and 3. The entered target animals are retained in cage 102 until they are released by allowing to leave through exit 120.

Various embodiments of cage 102 and attracting device 122 are illustrated and discussed herein as examples and not limitations. For example, cage 102 can have any shape and size suitable for specified type(s) of target animals, and attracting device 122 can include any means suitable for luring the specified type(s) of target animals into cage 102.

Figure 2:
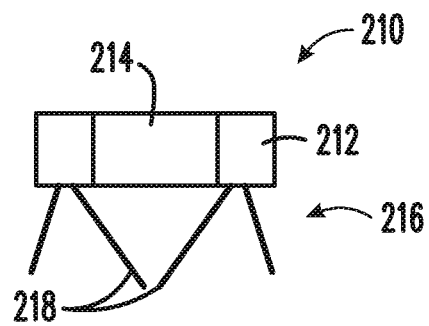
FIG. 2 shows a cross-sectional view illustrating an embodiment of an entry of a cage of a system for attracting and capturing target animals, such as the system of FIG. 1.
Figure 3:
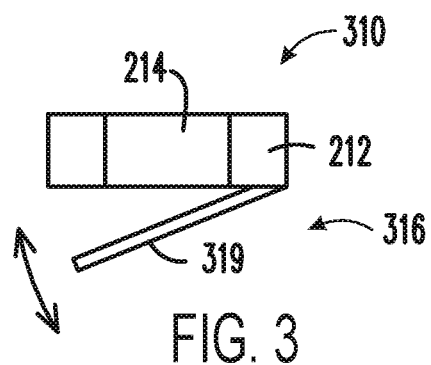
FIG. 3 shows a cross-sectional view illustrating another embodiment of an entry of a cage of a system for attracting and capturing target animals, such as the system of FIG. 1.

FIG. 2 shows a cross-sectional view illustrating an embodiment of an entry 210 of a cage of a system for attracting and capturing target animals, such as cage 102. FIG. 3 shows a cross-sectional view illustrating an embodiment of an entry 310 of a cage of a system for attracting and capturing target animals, such as cage 102. Entries 210 and 310 each represent an example of entry 110, and a combination of entries 210 and 310 represent another example of entry 110.

Entries 210 and 310 are each a substantially unidirectional entry on the roof and each include an entry frame 212 and a hole 214 on entry frame 212. Hole 214 can be sized to allow the target animals to enter, according to anticipated sizes of the target animals. Holes 214 can be in the form of a slot or any other suitable holes determined based on, for example, the overall cage design.

Entries 210 and 310 each include a substantially unidirectional barrier on an underside (the side inside the cage) of the entry to allow the target animals to enter the cage through the entry and to prevent the animals from exiting the cage through the entry. Entry 210 is a spiked entry that include a substantially unidirectional barrier 216. Barrier 216 includes at least spikes 218 on the underside of the entry. Entry 310 is a deflected entry that include a substantially unidirectional barrier 316. Barrier 316 includes at least one or more deflectors 319 on the underside of the entry.

In various embodiments, entry 100, including its various embodiments, can include spikes and/or one or more deflectors on the underside of entry 100 along the hole of the entry. For example, entry 110 in its various embodiments can include spikes 218, one or more deflectors 319, or both spikes 218 and one or more deflectors 319 as the unidirectional barrier. In various embodiments, hole 214 and barrier 216 and/or 316 are sized and arranged for one or more specified types of the target animals.

Each of barriers 216 and 316 are in their rest state when no target animal is passing through hole 214 and are positioned to prevent the animals from exiting the cage through the entry in their rest state. For example, some of spikes 218 and/or deflector(s) 319 can be temporary bent or deflected from their rest state during each entry of one or more target animals and return to their rest state after that entry. This allows multiple target animals to enter the cage through the entry in a repeatable manner, i.e., one animal at a time or a few animals at a time, with multiple entries before the entered target animals are released.

Entry 100, including its various embodiments, is "substantially" unidirectional because the unidirectional barriers 216 and 316 are each "substantially" unidirectional. They are "substantially" directional because a target or non-target animal may be able to exit the cage through the entry under certain circumstances, such as when the animal is smaller than a certain size, or when a large bird opens a deflector when entering the cage through the entry, thereby creating a temporary opening for one or more small birds to escape. Also, "to prevent the animals from exiting the cage through the entry" as discussed herein includes to discourage the animals from exiting the cage through the entry, rather than making it absolutely impossible, which may not be practical to implement.

Figure 4:
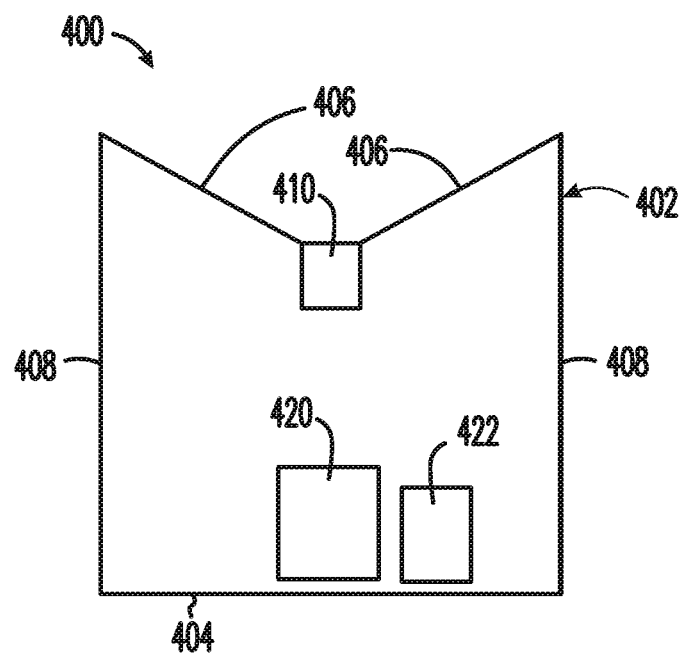
FIG. 4 shows a side view illustrating another embodiment of a system for attracting and capturing target animals.
Figure 5:
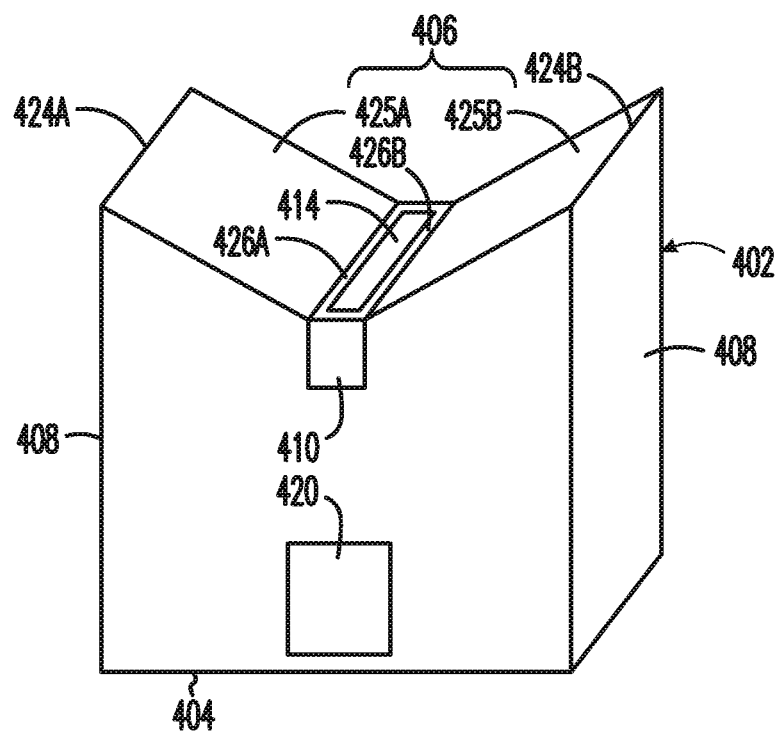
FIG. 5 shows a perspective view illustrating an embodiment of a cage of the system of FIG. 4.

FIG. 4 shows a side view illustrating an embodiment of a system 400 for attracting and capturing target animals. System 400 can represent an example of system 100 and includes a cage 402 and an attracting device 422. FIG. 5 shows a perspective view of cage 402.

Cage 402 can represent an example of cage 102 and includes a floor 404, a V-shaped roof 406, walls 408, an entry 410, and an exit 420. For example, cage 402, including floor 404, roof 406, walls 408, entry 410, and exit 420, can be substantially similar to cage 102 in its design and construction as discussed above except for the specific shapes of each component. As illustrated in FIG. 5, V-shaped roof (also known as "butterfly roof") 406 includes a first slope 425A having a first slope upper end (first eave) 424A and a first slope lower end 426A and a second slope 425B having a second slope upper end (second cave) 424B and a second slope lower end 426B. First slope lower end 426A and second slope lower end 426B form a valley (bottom) of V-shaped roof 406. Entry 410 is at the valley of V-shaped roof 406, coupled between first slope lower end 426A and second slope lower end 426B. Entry 410 can represent an example of entry 110 and can includes the features of entries 210 and/or 310. That is, entry 410 in its various embodiments can include spikes 218, one or more deflectors 319, or both spikes 218 and one or more deflectors 319 as the unidirectional barrier. Entry 410 can include a slot 414 as the hole of the entry. Slot 414 is coupled between, and substantially parallel to, first slope lower end 426A and second slope lower end 426B. Slot 414 can be can be sized to allow the target animals to enter, according to anticipated sizes of the target animals.

Figure 6:
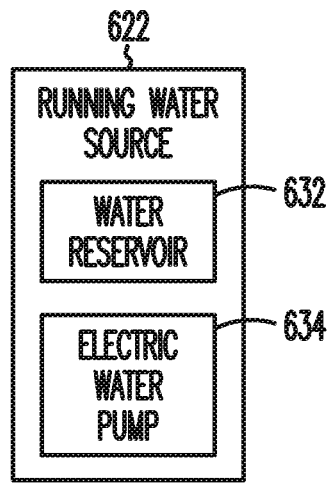
FIG. 6 shows a block diagram illustrating an embodiment of a running water source used as an attracting device in a system for attracting and capturing target animals, such as the system of FIG. 1 or FIG. 4.

FIG. 6 shows a block diagram illustrating an embodiment of a running water source 622. Running water source 622 can represent an example of attracting device 122 or 422 and is to be placed inside cage 102 or 402, respectively. In various embodiments, running water source 622 can be moved into and from cage 102 or 402, for example through exit 120 or 420, respectively. In various embodiments, running water source 622 can be affixed to a portion of cage 102 or 402 or detachably attached to a portion of the cage 102 or 402.

Running water source 622 can include a water reservoir 632 and an electric water pump 634 to create a continuous water fountain and/or stream that attract birds toward it. Birds can be lured into the cage through the entry for access to the running water source.

Figure 7:
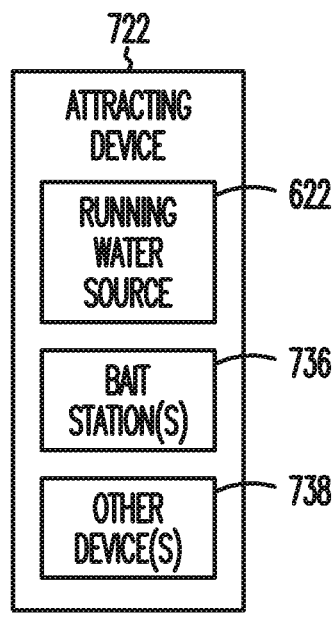
FIG. 7 shows a block diagram illustrating an embodiment of an attracting device in a system for attracting and capturing target animals, such as the system of FIG. 1 or FIG. 4.

FIG. 7 shows a block diagram illustrating an embodiment of an attracting device 722, Attracting device 722 can represent another example of attracting device 122 or 422 and is to be placed inside cage 102 or 402, respectively. In various embodiments, attracting device 722 can be moved into and from cage 102 or 402, for example through exit 120 or 420, respectively. In various embodiments, attracting device 722 can be affixed to a portion of cage 102 or 402 or detachably attached to a portion of the cage 102 or 402.

In the illustrated embodiment, attracting device 722 can include running water source 622, one or more bait stations 736 to contain one or more non-toxic baits, and one or more other devices 738 to produce one or more additional attracting effects (e.g., decoy or any device that produces a sound and/or visual effect known to attract birds). In various embodiments, attracting device 722 can include any one or any combination of running water source 622, bait station(s) 736, and other device(s) 738.

Figure 8:
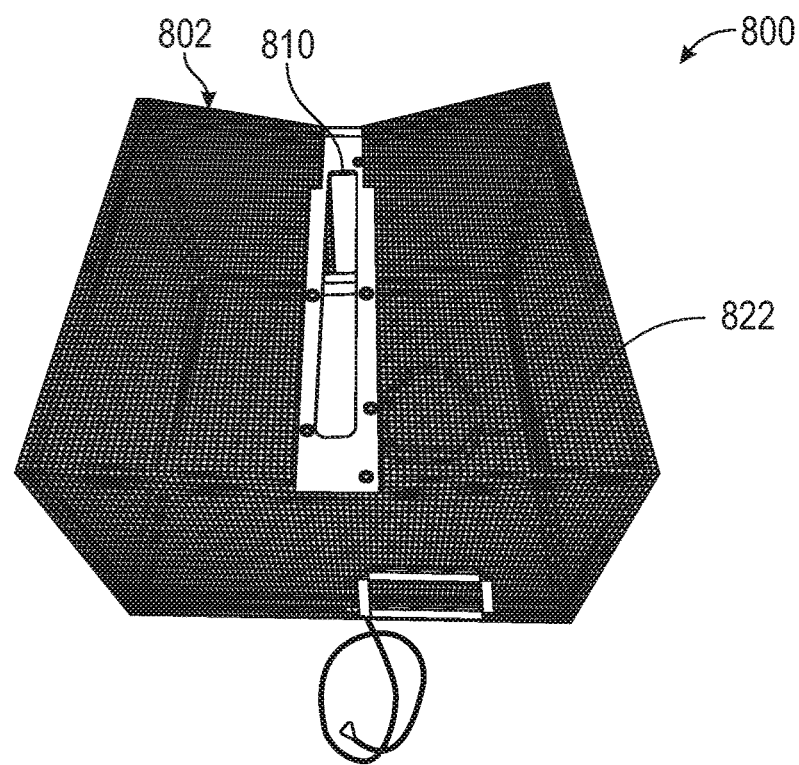
FIG. 8 shows an illustration of another embodiment of a system for attracting and capturing target animals.
Figure 9:
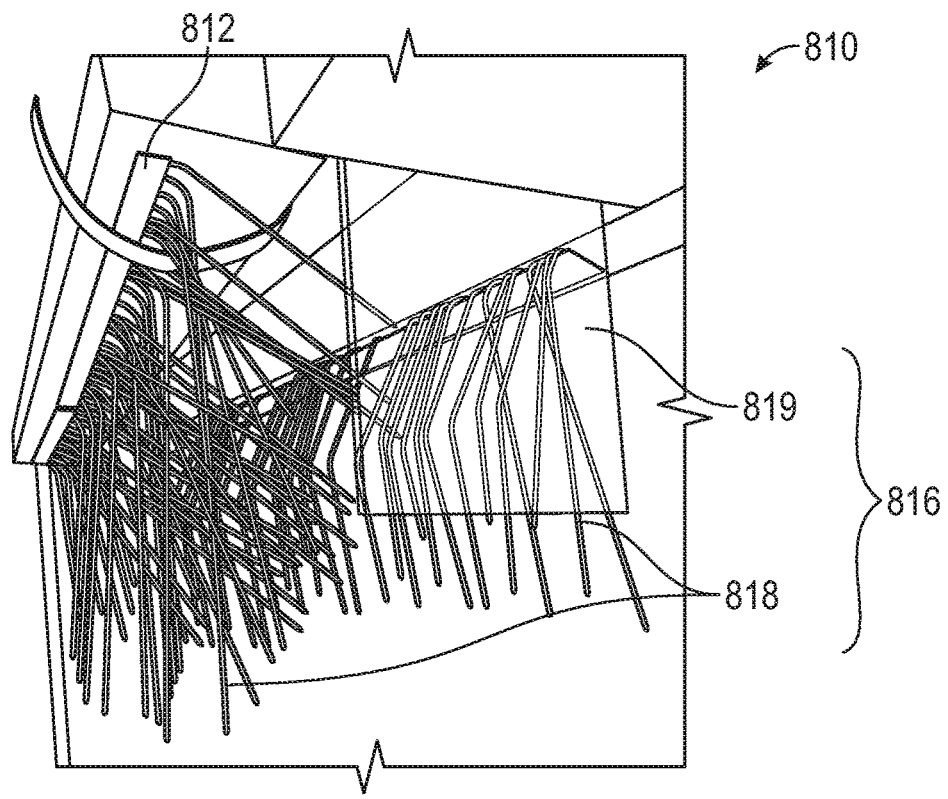
FIG. 9 shows an illustration of an embodiment of an entry of a cage of the system of FIG. 8.

FIG. 8 shows an illustration of an embodiment of a system 800 for attracting and capturing target animals. System can represent an implementation example of system 400 and includes a cage 802 and an attracting device 822. Cage 802 includes an entry 810, which can represent an implementation example of entry 410. In the illustrated embodiment, attracting device 822 includes running water source 622, FIG. 9 shows an illustration of an embodiment of entry 810. In the illustrated embodiment, entry 810 includes an entry frame 812 a unidirectional barrier 816 affixed onto the underside of entry frame 812. Entry frame 812 is coupled to the V-shaped roof of cage 802 at the valley of the roof. Barrier 816 includes spikes 818 and deflectors 819 for preventing the target animals such as birds from exiting cage 802 through entry 810.

Figure 10:
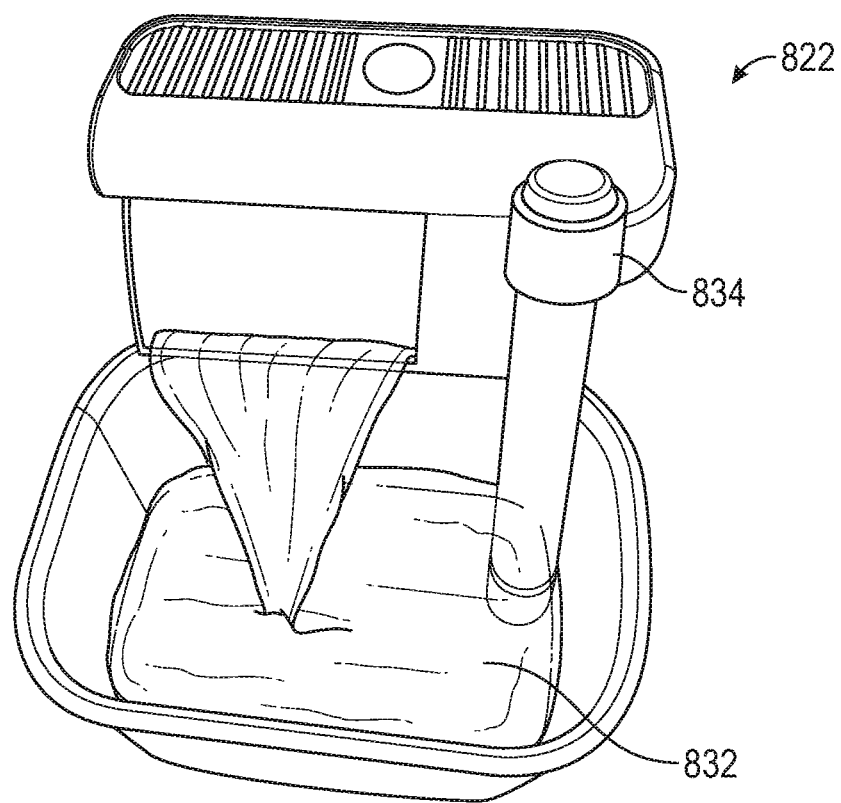
FIG. 10 shows an illustration of an embodiment of an attracting device of the system of FIG. 8.

FIG. 10 shows an illustration of an embodiment of an attracting device 822, which can represent an implementation example of running water source 622. In the illustrated embodiment, attracting device 822 includes a water reservoir 832 and an electric water pump 834 to create a water fountain to lure the target animals such as birds into cage 802 through entry 810 for access to the water. Once entering cage 802, the target animals are prevented from leaving cage 802 until they are intentionally released, for example after being transported to a remote area that is safe for the birds.

In various embodiments, system 100, including its various embodiments as discussed above (e.g., system 400 and system 800) can be used alone or in combination with other means for bird control. Examples of the other means include those discussed in U.S. Pat. No. 10,709,128 B2, entitled "METHOD AND APPARATUS FOR BIRD CONTROL", and U.S. Patent Application Publication No. 2022/0046910 A1, entitled "METHOD AND APPARATUS FOR BIRD CONTROL USING LASER", both assigned to Ecolab USA, Inc., which are incorporated herein by reference in their entireties.

Some non-limiting examples (Examples 1-20) of the present subject matter are provided as follows:

In Example 1, an apparatus for attracting and capturing target animals may include a cage and an attracting device. The cage may include a floor, a roof, walls coupled between the floor and the roof and an entry on the roof. The entry may define a hole and a substantially unidirectional barrier adjacent the hole. The substantially unidirectional barrier may include spikes arranged to allow the target animals to enter the cage through the hole and to prevent the entered target animals from exiting the cage through the hole. The attracting device may be configured to be placed in the cage to attract the target animals into the cage.

In Example 2, the subject matter of Example 1 may optionally be configured such that the substantially unidirectional barrier includes one or more deflectors each configured and arranged to allow the target animals to enter the cage through the hole and to prevent the entered target animals from exiting the cage through the hole.

In Example 3, the subject matter of any one or any combination of Examples 1 and 2 may optionally be configured such that the roof includes a sloped roof including at least one slope having a slope upper end and a slope lower end, and the entry is positioned at the slope lower end.

In Example 4, the subject matter of Example 3 may optionally be configured such that the sloped roof includes a V-shaped roof including a first slope, a second slope, and a valley. The first slope has a first slope upper end and a first slope lower end. The second slope has a second slope upper end and a second slope lower end. The valley is formed by the first slope lower end and the second slope lower end. The entry is at the valley.

In Example 5, the subject matter of Example 4 may optionally be configured such that the entry includes a frame coupled between the first slope lower end and the second slope lower end, the hole is a slot in the frame, and the slot is sized to allow the target animals to enter the cage.

In Example 6, the subject matter of any one or any combination of Examples 2 to 5 may optionally be configured such that the substantially unidirectional barrier includes multiple deflectors.

In Example 7, the subject matter of any one or any combination of Examples 1 to 6 may optionally be configured such that the attracting device is configured to produce at least one of a sound effect or a visual effect.

In Example 8, the subject matter of Example 7 may optionally be configured such that the attracting device includes a running water source. The running water source includes a water reservoir and an electric water pump.

In Example 9, the subject matter of any one or any combination of Examples 7 and 8 may optionally be configured such that the attracting device further includes one or more bait stations.

In Example 10, the subject matter of any one or any combination of Examples 1 to 9 may optionally be configured such that the attracting device is detachably attached to a portion of the cage.

In Example 11, an apparatus for capturing target animals employs at least one of a sound effect, a visual effect, food, or water as an attractor. The apparatus includes a cage that may include a floor, a roof, walls coupled between the floor and the roof so as to create ab enclosure, and means incorporated onto the roof for allowing the target animals to enter the enclosure while preventing the entered target animals from exiting the enclosure, including at least spikes.

In Example 12, the subject matter of Example 11 may optionally be configured such that the roof includes a sloped roof including at least one slope having a slope upper end and a slope lower end, and the means incorporated onto the roof for allowing the target animals to enter the enclosure while preventing the entered target animals from exiting the enclosure is adjacent the slope lower end.

In Example 13, the subject matter of Example 12 may optionally be configured such that the sloped roof includes a V-shaped roof including a first slope, a second slope, and a valley coupled between the first slope and the second slope, and the means adjacent the slope lower end for allowing the target animals to enter the enclosure while preventing the entered target animals from exiting the enclosure is at the valley.

In Example 14, the subject matter of any one or any combination of Examples 12 and 13 may optionally be configured such that the means adjacent the slope lower end for allowing the target animals to enter the enclosure while preventing the entered target animals from exiting the enclosure further includes one or more deflectors.

In Example 15, the subject matter of Example 14 may optionally be configured such that the means adjacent the slope lower end for allowing the target animals to enter the enclosure while preventing the entered target animals from exiting the enclosure comprises a slot, and the spikes and the one or more deflectors are arranged adjacent the slot.

In Example 16, a method for attracting and capturing target animals is provided. The method may include providing a cage including a floor, a roof, walls coupled between the floor and the roof, and an entry on the roof, placing the cage in an area from which the target animals are intended to be excluded, and producing an attracting effect to lure the target animals into entering the cage using an attracting device. The entry of the cage may be configured to allow the target animals to enter the cage through a hole and to prevent the entered target animals from exiting the cage using a substantially unidirectional barrier including spikes arranged to prevent the entered target animals from exiting the cage through the hole.

In Example 17, the subject matter of providing the cage as found in Example 16 may optionally include sizing the hole for allowing one or more specified types of birds to enter the cage, and the subject matter of producing the attracting effect as found in Example 16 may optionally include providing a running water source for luring the one or more specified types of the birds into entering the cage.

In Example 18, the subject matter of any one or any combination of Examples 16 and 17 may optionally further include adding one or more deflectors to the substantially unidirectional barrier.

In Example 19, the subject matter of providing the cage as found in any one or any combination of Examples 16 to 18 may optionally further include providing a sloped roof, as the roof, including at least one slope having a slope upper end and a slope lower end, and positioning the entry adjacent the slope lower end.

In Example 20, the subject matter of providing the cage as found in Example 19 may optionally include providing the cage with a V-shaped roof as the sloped roof. The V-shaped roof includes a first slope, a second slope, and a valley. The first slope has a first slope upper end and a first slope lower end. The second slope has a second slope upper end and a second slope lower end. The valley is formed by the first slope lower end and the second slope lower. The subject matter of providing the cage as found in Example 19 may optionally further include positioning the entry in the valley with the hole being a slot substantially parallel to the first slope lower end and the second slope lower end.

The foregoing examples are not limiting or exclusive, and the scope of the present subject matter is to be determined by the specification as a whole, including the claims and drawings.

The above description includes references to the accompanying drawings, which form a part of the detailed description. The drawings show, by way of illustration, varying embodiments in which the invention can be practiced. The application also refers to "examples." Such examples can include elements in addition to those shown or described. The foregoing examples are not intended to be an exhaustive or exclusive list of examples and variations of the present subject matter.

This application is intended to cover adaptations or variations of the present subject matter. It is to be understood that the above description is intended to be illustrative, and not restrictive. The scope of the present invention should be determined with reference to the appended claims, along with the full scope of legal equivalents to which such claims are entitled.

What is claimed is:

1. An apparatus for attracting and capturing target animals, comprising:
   a cage including a floor, a roof, walls coupled between the floor and the roof, and an entry on the roof, the entry including a frame, a hole on the entry frame, and a substantially unidirectional barrier adjacent the hole, the substantially unidirectional barrier including spikes directly coupled to the frame and one or more deflectors directly coupled to the frame, the spikes and the one or more deflectors configured and arranged to allow the target animals to enter the cage through the hole and to prevent the entered target animals from exiting the cage through the hole; and
   an attracting device configured to be placed in the cage to attract the target animals into the cage.

2. The apparatus of claim 1, wherein the spikes and the one or more deflectors are configured to be temporarily bent from a rest state during each entry of one or more animals of the target animals and to return to the rest state after that entry.

3. The apparatus of claim 1, wherein the roof comprises a sloped roof including at least one slope having a slope upper end and a slope lower end, and the entry is positioned at the slope lower end.

4. The apparatus of claim 3, wherein the sloped roof comprises a V-shaped roof including a first slope, a second slope, and a valley, the first slope having a first slope upper end and a first slope lower end, the second slope having a second slope upper end and a second slope lower end, the valley formed by the first slope lower end and the second slope lower end, and the entry is at the valley.

5. The apparatus of claim 4, wherein the frame is coupled between the first slope lower end and the second slope lower end, the hole is a slot in the frame, and the slot is sized to allow the target animals to enter the cage.

6. The apparatus of claim 1, wherein the attracting device is configured to produce at least one of a sound effect or a visual effect.

7. The apparatus of claim 6, wherein the attracting device comprises a running water source including a water reservoir and an electric water pump.

8. The apparatus of claim 7, wherein the attracting device is detachably attached to a portion of the cage.

9. The apparatus of claim 7, wherein the attracting device further comprises one or more bait stations.

10. The apparatus of claim 9, wherein the attracting device further comprises a decoy.

11. An apparatus for capturing target animals that employs at least one of a sound effect, a visual effect, food, or water as an attractor, comprising:
   a cage including:
      a floor,
      a roof;
      walls coupled between the floor and the roof so as to create an enclosure; and
      means incorporated onto the roof for allowing the target animals to enter the enclosure while preventing the entered target animals from exiting the enclosure, including spikes and one or more deflectors, the spikes configured to be temporarily bent from a rest state during each entry of one or more animals of the target animals and to return to the rest state after that entry.

12. The apparatus of claim 11, wherein the roof comprises a sloped roof including at least one slope having a slope upper end and a slope lower end, and the means incorporated onto the roof for allowing the target animals to enter the enclosure while preventing the entered target animals from exiting the enclosure is adjacent the slope lower end.

13. The apparatus of claim 12, wherein the sloped roof comprises a V-shaped roof including a first slope, a second slope, and a valley coupled between the first slope and the second slope, and the means adjacent the slope lower end for allowing the target animals to enter the enclosure while preventing the entered target animals from exiting the enclosure is at the valley.

14. The apparatus of claim 13, wherein the means adjacent the slope lower end for allowing the target animals to enter the enclosure while preventing the entered target animals from exiting the enclosure comprises a slot, and the spikes and the one or more deflectors are arranged adjacent the slot.

15. A method for attracting and capturing target animals, comprising:
   providing a cage including a floor, a roof, walls coupled between the floor and the roof, and an entry on the roof, the entry including a frame and a hole on the frame and configured to allow the target animals to enter the cage through the hole and to prevent the entered target animals from exiting the cage using a substantially unidirectional barrier including spikes directly coupled to the frame and one or more deflectors directly coupled to the frame, the spikes and the one or more deflectors arranged to prevent the entered target animals from exiting the cage through the hole, the spikes including at least bendable spikes configured to be temporarily bent from a rest state during each entry of one or more animals of the target animals and to return to the rest state after that entry;
   placing the cage in an area from which the target animals are intended to be excluded; and
   producing an attracting effect to lure the target animals into entering the cage using an attracting device.

16. The method of claim 15, wherein providing the cage comprises sizing the hole for allowing one or more specified types of birds to enter the cage, and producing the attracting effect comprises providing a running water source for luring the one or more specified types of the birds into entering the cage.

17. The method of claim 16, wherein providing the cage comprises:
   providing a sloped roof as the roof, the sloped roof including at least one slope having a slope upper end and a slope lower end; and
   positioning the entry adjacent the slope lower end.

18. The method of claim 17, wherein providing the cage comprises:

providing the cage with a V-shaped roof as the sloped roof, the V-shaped roof including a first slope, a second slope, and a valley, the first slope having a first slope upper end and a first slope lower end, the second slope having a second slope upper end and a second slope lower end, the valley formed by the first slope lower end and the second slope lower; and positioning the entry in the valley with the hole being a slot substantially parallel to the first slope lower end and the second slope lower end.

19. The method of claim 15, wherein using an attracting device comprises detachably attaching the attracting device to a portion of the cage.

20. The method of claim 16, wherein producing the attracting effect further comprises providing one or more bait stations.

* * * * *